United States Patent [19]

Moller

[11] 4,148,100
[45] Apr. 3, 1979

[54] APPARATUS AND METHOD FOR MIXING FLUFFY AND RIGID PLASTICS MATERIALS

[75] Inventor: Richard W. Moller, Grand Blanc, Mich.

[73] Assignee: HydReclaim Corporation, Grand Blanc, Mich.

[21] Appl. No.: 860,838

[22] Filed: Dec. 15, 1977

[51] Int. Cl.² ........................... B01F 7/00; B01F 15/02
[52] U.S. Cl. .................................... 366/150; 366/168; 366/181
[58] Field of Search ................ 366/150–158, 366/177, 181, 168; 425/200–202, 208, 209, 131.1

[56] References Cited

U.S. PATENT DOCUMENTS

| | | | |
|---|---|---|---|
| 1,582,945 | 5/1926 | Van Luven | 425/209 X |
| 1,599,274 | 9/1926 | Bicknell et al. | 425/209 |
| 2,094,839 | 10/1937 | Gassman et al. | 425/209 X |
| 2,785,455 | 3/1957 | McElroy | 366/167 |
| 2,962,786 | 12/1960 | Hawk, Sr. et al. | 425/131.1 |
| 3,000,055 | 9/1961 | Schlicksupp | 425/202 |
| 3,239,907 | 3/1966 | Harshbarger et al. | 425/202 |
| 3,362,044 | 1/1968 | Irving | 425/202 |
| 4,063,860 | 12/1977 | Cushing | 425/202 |

Primary Examiner—Leonard D. Christian
Attorney, Agent, or Firm—Learman & McCulloch

[57] ABSTRACT

Apparatus and methods for mixing fluffy scrap and rigid plastics materials for subsequent discharge of the mixture to an extruder comprises an upright mixing chamber to which rigid, fluent plastics pellets are fed by gravity and into which fluffy, ground scrap plastics material is fed by positive drive means from a hopper. Delivery of an adequate quantity of scrap material to the mixing chamber is assured by the provision in the scrap hopper of an agitating mechanism which is interposed between the top and the bottom of the hopper and which is operable to permit scrap material to pass downwardly to the bottom of the hopper for engagement by a feeding auger, but which prevents subjecting such scrap material to the weight of additional scrap in the hopper, thereby preventing bridging of the scrap at the lower end of the hopper. Feeding of the base and scrap materials from the mixing chamber to the extruder is achieved by a rotary auger having an interrupted vane which provides for alternate compaction and expansion of the scrap material with consequent facilitation of the entry of base material to the mixing chamber.

15 Claims, 3 Drawing Figures

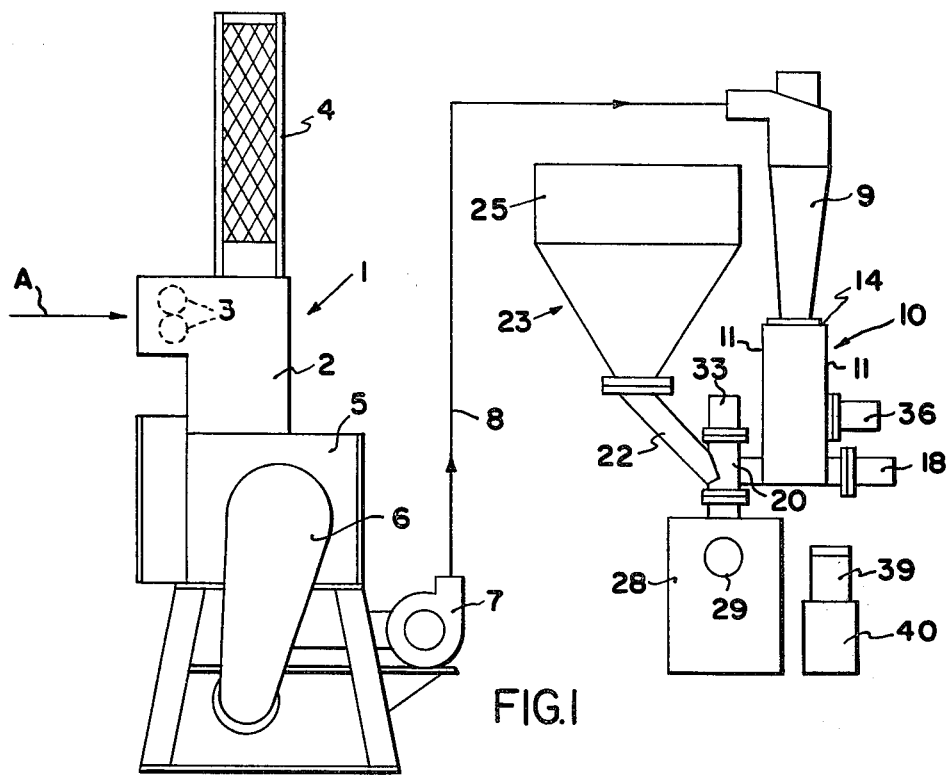
FIG.1
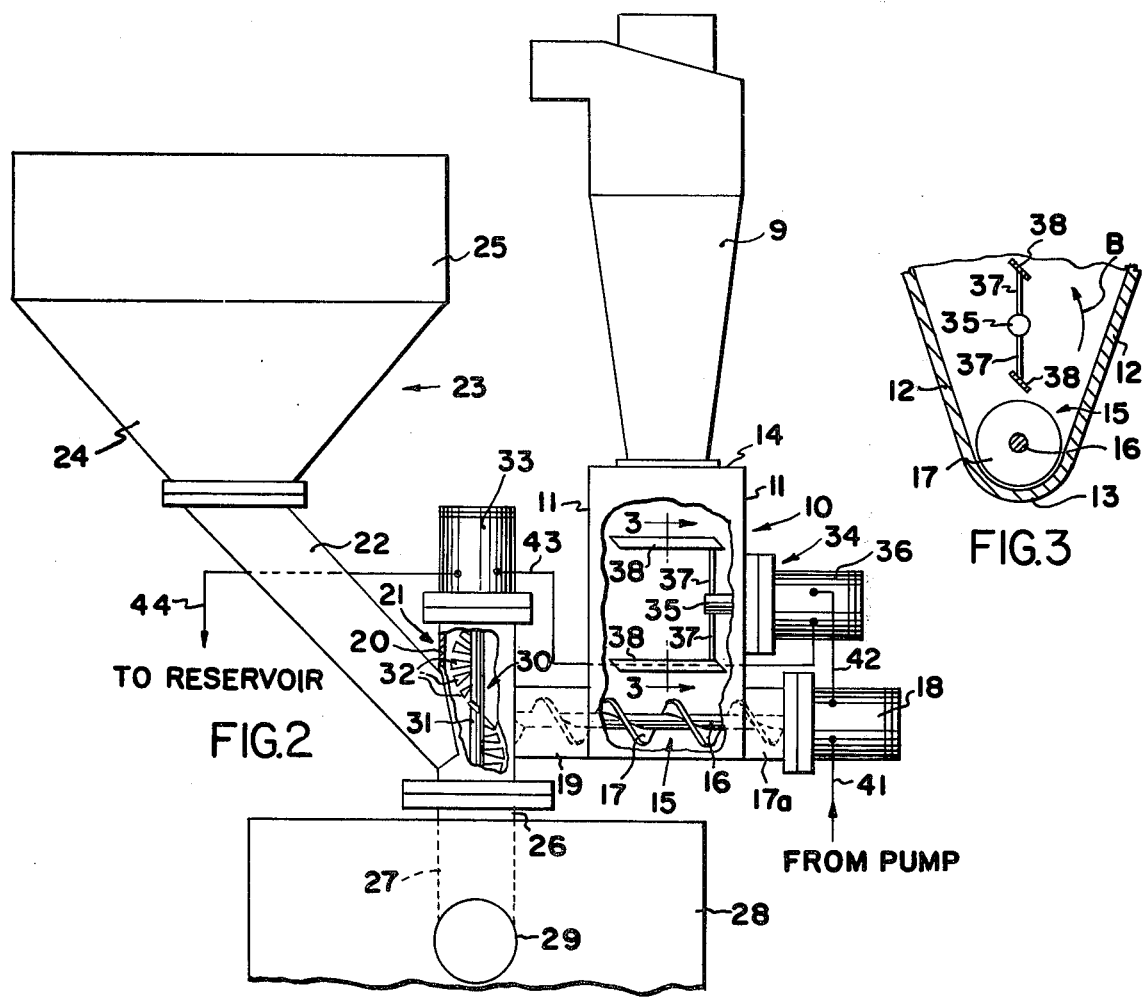
FIG.2
FIG.3

APPARATUS AND METHOD FOR MIXING FLUFFY AND RIGID PLASTICS MATERIALS

BACKGROUND OF THE INVENTION

It now is common in the manufacture of plastics articles to supply the extruder with a combination of base or virgin material and scrap material such as that created by the trimming and finishing of previously extruded products. Apparatus for mixing scrap and base materials for subsequent discharge to an extruder is disclosed in application Ser. No. 638,911, filed Dec. 8, 1975. The base or virgin material conventionally is in the form of dense, solid pellets which are readily fluent, whereas the scrap material is chopped or ground film that is rather fluffy, relatively non-fluent, and less dense than the base material. The ability of the base material to flow makes it possible to feed the base material without reliance on a driven feed mechanism, such as an auger, but the fluffiness of the ground scrap, coupled with its lower density, usually necessitates the use of positive feed means to effect movement of the scrap material. The grinding, chopping, and movement of the scrap material quite often causes the latter to acquire a static electrical charge which further interferes with the free flow of the scrap material. Thus, when the scrap is accumulated in the hopper from which it subsequently is to be discharged, it is not uncommon for the pieces of scrap material to form a bridge adjacent the bottom of the hopper and interfere with the movement of scrap out of the hopper.

To prevent bridging of scrap material adjacent the bottom of a hopper it has been proposed heretofore to utilize agitating arms which rotate within the hopper. Such arms conventionally are rotated about a vertical axis and are inclined to such axis at an angle corresponding to the taper of the hopper. Although such agitating arms do facilitate the downward flow of scrap through the hopper, they result in establishment of what may be termed a head of scrap extending upwardly from the bottom of the hopper. A substantial weight of scrap material thus may occupy the hopper and if such scrap is fed from the hopper horizontally, rather than vertically, substantial heat can be generated in effecting horizontal discharge of the scrap. The generation of heat is objectionable because it may result in liquification of the scrap material in the hopper.

The simultaneous introduction of scrap and base plastics materials into a mixing or blending chamber also presents problems due to the difference in densities between the base and scrap materials, particularly if the scrap is fed into the base material. That is, if the less dense scrap is fed into a column of denser base material, the force required to displace the denser material with the less dense material results in the generation of heat which may effect premature liquification of the less dense material.

SUMMARY OF THE INVENTION

Apparatus and methods according to the invention avoid the problems referred to above by the provision of agitating means in the scrap hopper which is operable to permit scrap to fall by gravity through the hopper toward the bottom, but which avoids constantly subjecting scrap material at the bottom of the hopper to the full weight of material at a higher level in the hopper. The apparatus also employs an interrupted vane feeding auger at the zone where the scrap and base materials are blended so as to provide for alternate compaction and expansion of the scrap material, thereby facilitating the mixing of base and scrap material.

The construction and operation of apparatus according to the invention are disclosed in the following description and the accompanying drawings, wherein:

FIG. 1 is a side elevational, somewhat schematic view of apparatus for blending scrap and virgin plastics materials for discharge to an extruder;

FIG. 2 is an enlarged view, with portions broken away, of the mixing and blending apparatus; and FIG. 3 is a sectional view taken on the line 3—3 of FIG. 2.

Apparatus constructed in accordance with a preferred embodiment of the invention is adapted for use with known plastics scrap conditioning apparatus 1 comprising a grinder 2 having powered feed rolls 3 by means of which sheet scrap may be introduced to the grinder in the direction of the arrow A. Scrap material also may be introduced to the grinder 2 via an upper inlet 4. Scrap from the grinder 2 is discharged to a housing 5 which communicates via an outlet 6 and a blower 7 with a conduit 8 by means of which the ground scrap is delivered to cyclone separator 9.

The apparatus thus far described forms no part of the invention per se.

Apparatus constructed in accordance with the invention comprises a scrap material hopper 10 having parallel, spaced apart end walls 11 and downwardly converging side walls 12 which merge to form a smoothly rounded bottom 13. The hopper 10 has an upper wall 14 having an opening therein which communicates with the discharge end of the separator 9 so that the hopper 10 is supplied continuously with ground scrap material which falls by gravity along a path leading toward the bottom 13 of the hopper.

Adjacent the bottom of the hopper is a power driven feed assembly 15 comprising a rotary shaft 16 on which is a helical vane 17. One end of the shaft 16 extends through a tubular housing 17a mounted on one end wall 11 of the hopper and is coupled to a preferably hydraulic driving motor 18. The other end of the shaft 16, together with the vane 17, extends through an outlet conduit 19 that is mounted on the opposite end wall 11 of the hopper and is joined to an upright cylinder 20 which forms a mixing chamber 21.

Joined to the cylinder 20 at the opposite side of the latter is a downwardly inclined conduit 22, the opposite end of which is coupled to the bottom of a hopper 23 having a conical bottom 24 depending from a cylindrical wall 25. The hopper 23 is adapted to contain readily fluent, rigid pellets of virgin plastics material.

The lower end of the cylinder 20 is coupled to a conduit 26 that communicates with the inlet throat 27 of a conventional extruder 28 having an outlet 29 at one end. Materials are fed from the mixing chamber 21 into the throat 27 by means of a power driven feed mechanism 30 comprising a rotary shaft 31 on which is an interrupted, helical vane comprising a plurality of individual segments 32.

The feed mechanism 30 corresponds to that disclosed in the aforementioned application Ser. No. 638,911 and to which reference may be had for a more detailed disclosure. Briefly, however, each segment 32 comprises a flat blade member having a curved periphery, a leading edge, and a trailing edge. Each segment is inclined to the longitudinal axis of the shaft 31 so that, upon rotation of the latter in the clockwise direction, as viewed in FIG. 2, each segment will drive material beneath it longitudinally of the mixing chamber toward its discharge or lower end. The spacing of each segment 32 longitudinally and circumferentially of the shaft 31 is such that a clearance exists between the trailing edge of each upper segment and the leading edge of the next lower segment. At its upper end the shaft 31 is coupled to a preferably hydraulic driving motor 33 which is mounted atop the cylinder 20.

Means for agitating and conditioning scrap material in the hopper 10 is designated by the reference character 34 and comprises a rotary shaft 35 coupled at one end to a preferably hydraulic motor 36 mounted on the hopper, the other end of the shaft 35 extending into the hopper and having a pair of diametrically opposed, radially extending arms 37 on each of which is fixed a blade 38. The shaft 35 is rotatable counterclockwise, as indicated by the arrow B in FIG. 3, about a horizontal axis parallel to the bottom 13 of the hopper, and each of the blades 38 is inclined in such manner that its leading edge is located at a greater distance from the axis of rotation of the shaft 35 than is its trailing edge. As a consequence, rotation of the blades in an orbital path causes material engaged by the blades to be deflected toward their axis of rotation.

The distance that each blade 38 extends radially from the axis of rotation of the shaft 35 is such as to provide sufficient clearance between the leading edges of the blades, the side walls 12 of the hopper, and the upper edge of the feed means 15 to enable free rotation of the blades without risk of trapping pieces of scrap between the blades, the side walls of the hopper, and the feeding mechanism.

Means for driving the hydraulic motors 18, 33, and 36 includes a variable speed hydraulic pump 39 which withdraws fluid from a reservoir 40 and delivers it, under pressure, to a line 41 which leads to the motor 18. Fluid from the motor 18 is delivered to the motor 36 via a line 42, and from the motor 36 fluid is delivered via a line 43 to the motor 33. Fluid from the motor 33 is returned to the reservoir 40 via a line 44.

The motors 18, 33, and 36 preferably are connected in series, as shown, so that failure of any one of them will result in interruption of operation of all. Preferably, each of the hydraulic motors has the same rated capacity, thereby enabling each motor to operate at an identical speed. The speed of operation of the motors may be varied, however, by varying the speed of operation of the pump 39.

To condition the apparatus for operation, a supply of virgin, fluent pellets of plastics material will be introduced to the hopper 23 from which the pellets may flow downwardly, by gravity, into the mixing chamber 21 via the conduit 22. Ground scrap will be delivered from the grinder 1 to the scrap hopper 10 so as to flow downwardly by gravity toward the bottom of the scrap hopper. Scrap which reaches the bottom of the hopper 10 will be fed horizontally into the mixing chamber 21 whence it is fed, together with the base material pellets, into the extruder 28 for liquification and subsequent discharge under pressure as is conventional.

As scrap material passes downwardly through the hopper 10, the agitator 34 is driven so that the blades 38 traverse the downward path of movement of the scrap. As each blade moves across the upper surface of the feed auger 15, material accumulated at the bottom of the hopper and in the path of the blade will be engaged by the latter and deflected upwardly, thereby periodically relieving scrap material entrained in the auger 15 at the bottom of the hopper 10 from the weight of scrap material thereabove. Scrap material at the bottom of the hopper thus is capable of movement toward the mixing chamber 21 considerably more easily than would be the case if such material constantly were subjected to the weight of all the higher scrap material.

At the same time that one blade 38 moves across the feed auger 15, the other blade engages material adjacent the upper end of the hopper 10 and deflects such material downwardly of the hopper, thereby providing periodic acceleration of material toward the bottom of the hopper. Introduction of scrap material into the hopper 10 thus is facilitated.

Since the flow of the base pellets into the mixing chamber 21 is due to gravity only, and since the feeding of scrap material into the mixing chamber is due to the positive feed auger 15, the quantity of base material which enters the mixing chamber is dependent upon or restricted, to a large extent, by the quantity of scrap material which is fed to the mixing chamber. It usually is desirable, however, to use a greater percentage of base material than of scrap. Adequate base material is assured because, as the scrap material enters the mixing chamber 21, it is engaged by the segments 32 of the feed auger so as to be moved downwardly toward the extruder 28. As each blade traverses that portion of the scrap material immediately beneath it, such material will be compressed axially of the cylinder 20, but as the blade leaves such portion of the material, the compressed material is enabled to expand somewhat, thereby providing space to accommodate pellets of base material. Thus, a combination of base and scrap materials may be fed continuously to the extruder 28.

Not all base and scrap materials are alike, nor should the same percentage of base and scrap materials necessarily be the same for all kinds of plastics extruding processes. The percentages of base and scrap materials may be adjusted by varying the speeds of operation of the driving motors 18, 33, and 36, and the best results for different kinds of materials can be determined empirically.

The disclosed embodiment is representative of a presently preferred form of the invention, but is intended to be illustrative rather than definitive thereof. The invention is defined in the claims.

I claim:

1. In apparatus for mixing ground fluffy scrap and rigid base material and feeding such mixture to an extruder or the like, and wherein such apparatus includes a scrap hopper having a bottom, means for introducing ground fluffy scrap into said scrap hopper for movement of said ground scrap along a path leading toward the bottom of said hopper, rigid base material supply means, a mixing chamber, means for delivering ground scrap from adjacent the bottom of said scrap hopper and base material from said supply means into said mixing chamber, and means for feeding a mixture of ground scrap and base materials from said chamber to an extruder or the like, the improvement comprising agitating means in said scrap hopper in the path of movement of ground scrap toward the bottom of said scrap hopper for agitating and periodically interrupting such downward movement of said ground scrap.

2. Apparatus according to claim 1 wherein said agitating means is rotatable about an axis positioned above and substantially parallel to the bottom of said hopper; and means for rotating said agitating means.

3. Apparatus according to claim 2 wherein said agitating means comprises at least one blade movable in an orbital path about said axis.

4. Apparatus according to claim 3 wherein said blade is pitched to deflect scrap engaged thereby toward said axis.

5. Apparatus according to claim 2 wherein said agitating means comprises a plurality of blades movable in an orbital path about said axis.

6. Apparatus according to claim 5 wherein each of said blades is pitched to deflect scrap engaged thereby toward said axis.

7. In apparatus for blending fluffy scrap material and fluent rigid base material for subsequent discharge to an extruder or the like and wherein said apparatus comprises an upright mixing chamber having an outlet at its lower end, first conduit means in communication with said chamber at a level above that of said lower end for delivering scrap material into said chamber, and second conduit means in communication with said chamber above the level of said lower end for delivering by gravity base material into said chamber, the improvement comprising positive drive means in said first conduit means for driving scrap material therethrough into said chamber in such quantity as to restrict the quantity of base material that may enter said chamber; feeding means in said mixing chamber for feeding scrap and base materials downwardly therefrom through said outlet and into an extruder or the like; and means for driving said feeding means.

8. Apparatus according to claim 7 wherein said feeding means comprises a rotary auger having an interrupted helical vane.

9. Apparatus according to claim 8 wherein said vane is composed of a plurality of individual blades.

10. Apparatus according to claim 9 wherein each of said blades is circumferentially and axially spaced from the next adjacent blade.

11. A method of conditioning ground fluffy material for subsequent discharge from a hopper, said method comprising introducing ground fluffy material into a hopper at a level such that said material may flow downwardly along a path leading to the bottom of the hopper; driving ground material outwardly of said hopper along the bottom thereof; and periodically relieving ground material adjacent the bottom of the hopper from the weight of ground material thereabove.

12. The method according to claim 11 wherein ground material accumulated adjacent the bottom of said hopper above that being driven outwardly is deflected upwardly.

13. The method according to claim 11 wherein said ground material is driven outwardly of said hopper along a substantially horizontal path.

14. The method according to claim 11 wherein ground material accumulated in said hopper above that being driven outwardly is displaced upwardly by passing a blade through such accumulated material.

15. Apparatus according to claim 1 wherein said agitating means comprises at least one elongate blade substantially spanning said hopper in a direction transverse to the downward movement of said ground scrap, said blade being pitched to deflect upwardly ground scrap adjacent the bottom of said hopper.

* * * * *